(12) United States Patent
Van Bommel et al.

(10) Patent No.: US 11,754,230 B2
(45) Date of Patent: Sep. 12, 2023

(54) OPTICAL STRUCTURE FOR PRODUCING DECORATIVE LIGHTING EFFECTS

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 44 days.

(21) Appl. No.: 17/630,845

(22) PCT Filed: Jul. 27, 2020

(86) PCT No.: PCT/EP2020/071074
§ 371 (c)(1),
(2) Date: Jan. 27, 2022

(87) PCT Pub. No.: WO2021/018813
PCT Pub. Date: Feb. 4, 2021

(65) Prior Publication Data
US 2022/0299171 A1 Sep. 22, 2022

(30) Foreign Application Priority Data
Aug. 1, 2019 (EP) .................................... 19189513

(51) Int. Cl.
*F21K 9/232* (2016.01)
*F21V 8/00* (2006.01)

(52) U.S. Cl.
CPC ............ *F21K 9/232* (2016.08); *G02B 6/0068* (2013.01)

(58) Field of Classification Search
CPC .............................. F21K 9/232; G02B 6/0068
See application file for complete search history.

(56) References Cited

U.S. PATENT DOCUMENTS 8,454,202 B2 * 6/2013 Markle ..................... F21V 3/00
362/382

FOREIGN PATENT DOCUMENTS

| CN | 107420769 A | 12/2017 |
| CN | 107740940 A | 2/2018 |
| CN | 107917350 A | 4/2018 |
| CN | 108916677 A | 11/2018 |
| DE | 102017103431 A1 | 8/2018 |
| EP | 2778502 A2 | 9/2014 |
| JP | 2013016493 A | 1/2013 |
| JP | 2014179318 A | 9/2014 |

(Continued)

*Primary Examiner* — Mary Ellen Bowman

(57) ABSTRACT

The present invention relates to an optical structure for producing a decorative lighting effect in a lighting device, and a lighting device comprising at least one of the optical structure, wherein the optical structure comprises an optical element formed in one piece and comprising at least one opening; and an LED-filament comprising a substrate and a plurality of light sources arranged on the substrate, the substrate being at least partly made of a flexible material; wherein the at least one opening is adapted to receive the LED-filament such that a portion of the LED-filament extends through and is at least partly enclosed by a surrounding wall of the at least one opening such that the LED-filament is guided by and held in place by means of the at least one opening of the optical element and wherein light emitted from the LED-filament interacts with the optical element.

14 Claims, 7 Drawing Sheets

(56) References Cited

FOREIGN PATENT DOCUMENTS

| | | |
|---|---|---|
| JP | 2019009032 A | 1/2019 |
| WO | 2010007568 A1 | 1/2010 |
| WO | 2016128509 A1 | 8/2016 |
| WO | 2016145448 A1 | 9/2016 |
| WO | 2018202625 A1 | 11/2018 |

* cited by examiner

OPTICAL STRUCTURE FOR PRODUCING DECORATIVE LIGHTING EFFECTS

CROSS-REFERENCE TO PRIOR APPLICATIONS

This application is the U.S. National Phase application under 35 U.S.C. § 371 of International Application No. PCT/EP2020/071074, filed on Jul. 27, 2020, which claims the benefit of European Patent Application No. 19189513.5, filed on Aug. 1, 2019. These applications are hereby incorporated by reference herein.

FIELD OF THE INVENTION

The present invention relates to an optical structure having a flexible filament for producing decorative lighting effects in a lighting device. The present invention also relates to a lighting device comprising such an optical structure, and to a method of manufacturing of such an optical structure.

BACKGROUND OF THE INVENTION

Incandescent lamps are rapidly being replaced by light emitting diode (LED)-based lighting solutions such as LED-filament lamps. It is nevertheless appreciated and desired by the users for these lamps to have the look of an incandescent light bulb. For this purpose, one can simply make use of the infrastructure for producing incandescent lamps based on glass and replace the conventional filament with LED filaments. One of the concepts is based on LED filaments made of flexible material and placed in such a light bulb. The appearances of these lamps are highly appreciated as they achieve omnidirectional lighting, look highly decorative and thanks to the flexibility of the filament's substrate may be manufactured in various shapes such as spiral or helix shapes.

One example of such LED-filament light bulbs with a flexible LED-filament is provided in CN108916677 wherein the LED-filament is wound around a stem of the lamp. The stem comprises support wires with a bent end creating a loop for fixating the LED-filament. The LED-filament forms a spiral shape which provides a more uniform illumination. The LED-filament also comprises a top portion, having a circular arc-shape, arranged relative the top of the bulb. This arrangement prevents the creation of a black spot at the top of the bulb.

Even though this light bulb disclosed in the prior art aims at providing a more uniform and decorative lighting, there are substantial drawbacks associated with the disclosed light bulb. The lamp relies on a central fixture with attached wire supports to carry the LED-filaments. This in turn increases the material cost and nevertheless has an unpleasant appearance to the users as the wire supports and the central structure alter the aesthetic appearance of the LED-filament and may even distort the intended lighting effects.

Therefore, there is a need in the field to further develop more appealing, and cost effective lighting solutions to achieve highly decorative lighting effects.

SUMMARY OF THE INVENTION

It is an object of the present invention to overcome or at least alleviate one or more of the aforementioned problems, and to provide an improved optical structure for producing decorative lighting with aesthetic appearance in a lighting device.

According to a first aspect of the invention, this and other objects are achieved by an optical structure for producing a decorative lighting effect in a lighting device, the optical structure comprising an optical element formed in one piece, and comprising at least one opening, an LED-filament comprising a substrate and a plurality of light sources arranged on the substrate, the substrate being at least partly made of a flexible material, wherein the at least one opening is adapted to receive the LED-filament such that a portion of the LED-filament extends through and is at least partly enclosed by a surrounding wall of the at least one opening such that the LED-filament is guided by and held in place by means of the at least one opening of the optical element and wherein light emitted from the LED-filament interacts with the optical element.

Within the context of this disclosure, a LED filament is providing LED filament light and comprises a plurality of light emitting diodes (LEDs) arranged in a linear array. Preferably, the LED filament has a length L and a width W, wherein L>5 W. The LED filament may be arranged in a straight configuration or in a non-straight configuration such as for example a curved configuration, a 2D/3D spiral or a helix. Preferably, the LEDs are arranged on an elongated carrier like for instance a substrate, that may be rigid (made from e.g. a polymer, glass, quartz, metal or sapphire) or flexible (e.g. made of a polymer or metal e.g. a film or foil).

In case the carrier comprises a first major surface and an opposite second major surface, the LEDs are arranged on at least one of these surfaces. The carrier may be reflective or light transmissive, such as translucent and preferably transparent.

The LED filament may comprise an encapsulant at least partly covering at least part of the plurality of LEDs. The encapsulant may also at least partly cover at least one of the first major or second major surface. The encapsulant may be a polymer material which may be flexible such as for example a silicone. Further, the LEDs may be arranged for emitting LED light e.g. of different colors or spectrums. The encapsulant may comprise a luminescent material that is configured to at least partly convert LED light into converted light. The luminescent material may be a phosphor such as an inorganic phosphor and/or quantum dots or rods.

The LED filament may comprise multiple sub-filaments.

The expression "enclosed" in the context of this disclosure is non-limiting and should be construed as forming a boundary partially or fully around the portion of the LED-filament installed inside the openings. In other words, the portion of the LED-filament installed in the openings may be partly enclosed by the periphery of the opening or a wall of the opening partly surrounding the portion of the LED-filament. The opening thus need not be closed on all sides. The opening may however fully surround the portion of the LED-filament forming a complete boundary around the portion of the LED-filament installed in the opening.

By "interact" here it is to be construed as optical interaction of light with matter e.g. that light may be partly reflected, partly coupled into, coupled out of, refracted or be transmitted through/inside the optical element.

The invention is based on the insight that, by directly mounting an LED-filament with a substrate made partly of flexible materials on an optical element comprising one or more opening(s) an improved decorative lighting effect can be produced. Further, light emitted from the LED-filament may interact with the optical element e.g. light may be partly coupled into and/or reflected by the optical element. The LED-filament having a substrate made partly of flexible material may also be referred to as "flexible LED-filament" in the rest of this disclosure. According to the invention, need for using additional components such as wires, rings, glue, etc. for affixing the flexible LED-filament to e.g. a conventional core rod or stem with the sole purpose of holding the LED-filament in place is eliminated. Instead, by using the inventive optical structure, the LED-filament can be installed into the openings of the optical element which guides and holds the LED-filament in place, thus providing the required mechanical support and stability. In addition, optical properties of the optical element produce the desired optical effects due to emitted light from the LED-filament interacting with the optical element. The optical element is preferably an elongated optical element.

Additionally, since the LED-filament can be removably mounted into the openings of the optical element without the need for any attachments rings or glue, it can be disconnected and/or reinstalled into the openings at any time e.g. during the manufacturing process.

This arrangement allows for a versatile and customizable shaping of appearance of the emitted light from the LED-filament(s) and can be easily manufactured with low-cost and less material consumption.

A variety of optically translucent materials, for instance transparent materials such as glass or plastic could be used to manufacture the optical element.

The flexible LED-filament may have a helix/spiral or meander shape or any other arbitrary shape formed to be inserted in and fit into the openings of the optical element. The flexible LED-filament may be formed in one plane e.g. meander in one plane, or be formed in a 3D structure.

Here the "opening" is to be broadly interpreted and simply refers to a recess, through-hole, slit, aperture, or gap, etc. formed in any part of the optical element of the optical structure. The opening may have various shapes, dimensions and orientations for the LED-filament to be inserted therein and/or extend there through. The openings may be arranged on one or more edge surface(s) of the optical element e.g. on the periphery of the optical element. The opening(s) may be discrete and/or connected opening(s) and be perforated/bored through the optical element thus allowing the LED-filaments to extend through from one side to the other side of the optical element. The LED-filaments thus may extend through part of or the entire length and/or width and/or depth of the optical element.

The LED-filament(s) may have dimensions, shapes and cross sections similar to that of the opening(s). For instance, both the openings and the LED-filament may have a circular or semi-circular cross-section. Furthermore, the LED-filament may be arranged in the openings at various angles relative to a longitudinal axis of the optical structure. The LED-filament may be simply inserted/fitted into the openings, be clamped into the openings or hedged into or snap-locked into the openings. The geometry of the openings/recesses may also be different from the LED-filaments e.g. the cross-section of the openings/recesses may be smaller than the cross-section of the LED-filaments.

According to one embodiment, the optical element may be made of a light-guiding material. Thus, the optical element may be an elongated optical element transporting light along its full area and/or length allowing for a controlled light distribution and customizable decorative lighting effects to be produced. Further, light may only be transported along a part or portion of the elongated optical element and be extracted, or coupled into and/or reflected by other portions of the elongated optical element and/or by other neighboring optical components. The optical element made of light-guiding materials may also at some instances be referred to as a light guide.

According to one embodiment, the surrounding wall of the at least one opening may comprise a light-incoupling surface for light emitted from the LED-filament to enter the optical element such that light may be at least partly coupled into the optical element via the light-incoupling surface. The optical element may be illuminated by the LED-filament and light be transported over the full area of the optical element or a part of the optical element by total internal reflections (TIR).

According to one embodiment, the optical element may further comprise a plurality of light-extraction features, wherein the plurality of light-extraction features are configured to out-couple/extract light from the optical element. Light-extraction features may for example be any indentation, perforation, curved or wavy structures, or sharp light-outcoupling features which may for example be patterned in one piece with the optical element and/or printed on top of the optical element etc. arranged on and/or made in one piece with the optical element. Light may be extracted from the optical element by extraction/out-coupling features counteracting the TIR.

According to one embodiment, the optical element may further comprise a plurality of perforations, the plurality of perforations forming a decorative pattern, such that the pattern may be illustrated when the plurality of perforations are illuminated by light emitted from said LED-filament. This way an effect is achieved by the inventive optical structure having an integrated pattern which corresponds preferably to an image, text, logotype, etc. thus producing further decorative lighting patterns by taking advantage of the emitted light being coupled into or reflected by the optical element. Therefore, there would be no need for arranging external patterns or shapes to be illuminated by the emitted light from the LED-filaments; the optical element itself produces the decorative pattern in addition to other decorative effects. Light which illuminates the integrated decorative pattern partly or entirely could be light which has been coupled into the light guide and reaches the perforations on its travel path inside the light guide. The perforations may thus function as light-extraction features or light-outcoupling surfaces and counteract TIR thus illustrating the perforated decorative pattern. Light may also reach the perforations via reflection from the optical element.

According to one embodiment, the optical element may be made of a light-reflecting material. Thus, the optical element may reflect light emitted from the LED-filament partly or fully in one or several directions and orientations e.g. in upwards or downwards directions. The optical element made of light-reflecting materials may also at some instances be referred to as a light reflector.

The shape and orientations of the light reflector may be customized to achieve desired decorative lighting effects. The light reflector may preferably be made of diffuse reflecting polymers. The reflector may also be specular reflector, prism reflector, or comprise light-redirecting features, and surfaces with reflective coatings, etc.

According to one embodiment, the optical element may further comprise a light-reflecting surface adapted to at least partly reflect light emitted from the LED-filament and/or light extracted from the optical element. This allows for taking advantage of both light-guiding and light-reflecting properties of the optical element since light is partly is coupled into the light guide and partly reflected by the light-reflecting surface(s) more complex decorative lighting effects can be produced.

According to one embodiment, the optical element may further comprise a plurality of at least partly curved light-reflecting features bent out of a reference plane of the optical element and arranged adjacent to the at least one opening.

The reference plane of the optical element is a normal plane of the optical element generally parallel to the surface of the optical element when that surface is flat (excluding the variations of the surface due to the curved features). The curved features 68 are thus bent out of the plane of the flat surface of the optical element 20. This way it is possible to redirect the light emitted from the LED-filament and/or the light extracted from the light guide towards certain parts of the optical structure. For instance, light may be fully or partially reflected by the curved light-reflecting features in the upwards and/or downwards directions i.e. towards the upper and/or lower parts of the optical structure. Light may also be redirected sideways or in lateral directions with respect to the optical structure. An advantage of this arrangement is to achieve customizable spatial light distributions.

According to one embodiment, the optical element may be made of a sheet of light guiding material and/or a plurality of intersecting sheets of light guiding material. The optical element may also be made of a sheet of light-reflecting material and/or a plurality of intersecting sheets of light-reflecting material.

This way one advantage can be achieved by arranging multiple sheets of light-guiding and/or light-reflecting segments in different angles and orientations with respect to each other.

According to one embodiment, the portion of the LED-filament arranged in the recesses/opening(s) may extend such that at a point of intersection with the longitudinal axis of the optical structure, a tangent of the portion of the LED-filament is normal to the longitudinal axis of the optical structure. In other words, the tangent of the LED-filament in the point of intersection may more preferably be arranged in a horizontal orientation with respect to the longitudinal axis of the optical structure. In some embodiments, the tangent of the portion of the LED-filament at the point of intersection with the longitudinal axis of the optical structure may be arranged at a first angle with respect to the longitudinal axis of the optical structure, and wherein the first angle may be in a range between 10 degrees to 90 degrees, more preferably between 30 degrees to 90 degrees and most preferably between 80 degrees to 90 degrees.

According to one embodiment, in operation, a main direction of light inside the optical element may be parallel with the longitudinal axis of the optical element and/or follow the shape of the optical element.

According to one embodiment, two or more portions of the LED-filament may be arranged to extend through respective two or more openings of the optical element. Further, two or more portions of the LED filament may be arranged to extend through the same at least one opening of the optical element. In some embodiments a plurality of LED-filaments may be mounted on the same optical element i.e. at least one portion of each of the plurality of LED-filaments may extend through the at least one opening of the optical element. In other embodiments, two or more portions of each LED-filament of the plurality of LED-filaments may be inserted into and extend through respective two or more openings of the optical element.

According to a second aspect of the present invention, there is provided a lighting device comprising at least one optical structure according to any of the preceding claims; wherein in operation said lighting device is configured to provide a decorative lighting effect. This aspect may exhibit the same or similar features and technical effects as the first aspect, and vice versa.

According to a third aspect of the present invention, there is provided a method of manufacturing an optical structure according to any one of the preceding claims, wherein the optical element of the optical structure is made by one of: extrusion, injection molding, embossing and laser cutting. This aspect may exhibit the same or similar features and technical effects as the first and/or second aspects, and vice versa.

It is noted that the invention relates to all possible combinations of features recited in the claims.

BRIEF DESCRIPTION OF THE DRAWINGS

These and other aspects of the present invention will now be described in more detail, with reference to the appended drawings showing embodiment(s) of the invention.

As illustrated in the figures, some features are or may be exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1A:
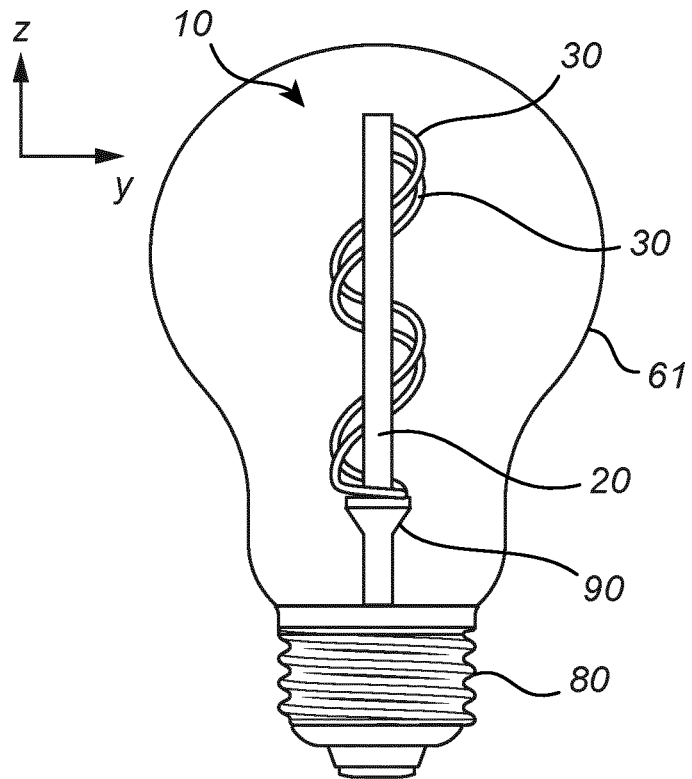
FIG. 1*a* shows a light bulb comprising an optical structure in accordance with at least one embodiment of the present invention.

FIG. 1a shows a lighting device such as a light bulb/lamp 61 comprising an optical structure 10, including one or several, in the illustrated case two, LED filaments 30 supported by an elongated optical element 20 according to an embodiment of the invention.

The LED-filament 30 is preferably made of a flexible substrate. For example, a plurality of solid state light sources such as light emitting diodes (LEDs) are placed on a flexible PCB (printed circuit board) to produce the flexible LED-filament 30. An encapsulant (not shown) may at least partly encapsulate the plurality of LEDs. The encapsulant is also preferably flexible, e.g. made of silicone (rubber). The encapsulant may also cover at least part (preferably fully) the first major surface of the substrate. The encapsulant may also cover at least part of the second major surface of the LEDs.

The optical structure 10 is intended to produce decorative lighting effects in the light bulb 61. The light bulb/lamp 61 may further comprise a base 80 and required electric contacts/electrodes 90 providing electric contact to external electricity sources or any additional contacting points. Of course, different placement of the base 80 and electrodes 90 is also possible. The optical structure 10 may be physically and/or electrically connected to the base 80 of the light bulb/lamp 61. It is noted that the present invention is not only applicable to light bulbs, but also to other lighting devices, e.g. luminaires.

Figure 1B:
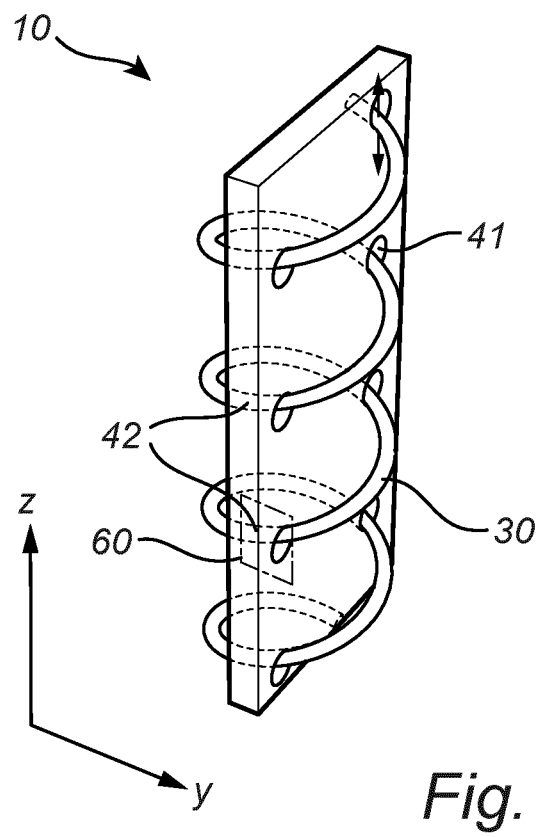
FIG. 1*b* shows an optical structure in accordance with an embodiment of the present invention.
Figure 1C:
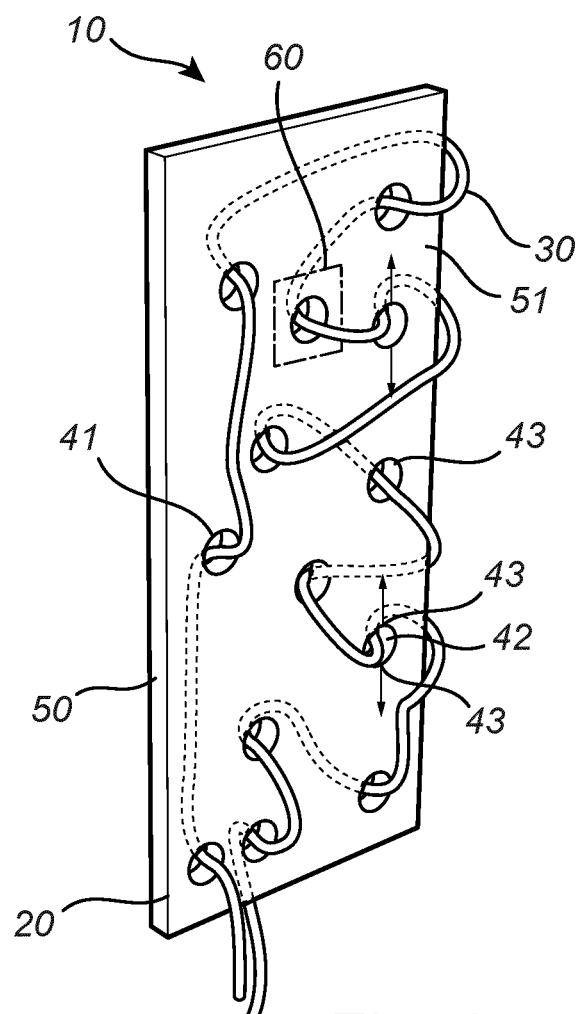
FIG. 1*c* shows an optical structure in accordance with a further embodiment of the present invention.

Two examples of an elongated optical element 20 is shown in more detail in perspective in FIGS. 1b and 1c, where it is generally shaped like a flat plate/sheet. Five other examples of elongated optical elements are shown in cross section in FIGS. 3a-e. The longest extension of an elongated optical element 20 may be in the z-direction (i.e. here the optical axis or axis of symmetry of the light bulb 61), however it may also extend in the x-direction or y-direction.

It is noted that the optical element is not necessarily elongated nor flat, but may also be shaped like a disc and/or comprise curved/bent features. The optical element 20 may for example be a rectangular cuboid (with a low thickness (extended e.g. in y-direction), for example in the range between 0.1 mm and 5 mm, preferably between 1 mm and 3 mm). The optical element 20 may also have a curved shape such as a meander shape.

The optical element 20 may be translucent, for example transparent (clear) and can e.g. be made of light-guiding materials such as PMMA (Poly(methyl methacrylate)), PC (Polycarbonate) or PS (polystyrene). In case the elongated optical element 20 is partly flexible, it could be made of silicone or PVC (polyvinylchloride). The elongated optical element 20 can be made of light-reflecting materials such as a diffuse reflecting polymer. It may be a sheet of polymer containing titanium oxide (TiO2) particles. It may also be a micro porous polymer. It may also be a sheet polymer provided with a reflective layer/coating of metal such as aluminum or a layer/coating of silver-based materials on some or all of its surfaces. The light-reflecting materials may preferably have a reflectance of 85% i.e. they reflect 85% of light incident on a surface made of such materials. They may more preferably have a reflectance of 90% or most preferably a reflectance of 92%.

The optical element 20 in FIGS. 1b and 1c is formed with at least one opening, here in the form of through holes 41. In other embodiments of the optical element 20, illustrated in FIGS. 3a-3d and discussed in more detail below, the openings are not through-holes but recesses 40 in the outer boundary of the element 20. The openings 40, 41 are preferably integrated with the rest of the elongated optical element 20, i.e. formed in one piece with the rest of the elongated optical element 20. The optical element 20 may comprise a plurality of N openings wherein preferably N>5, more preferably N>10, most preferably N>15 such as N=20.

According to the invention, the openings 40, 41 are configured to mechanically hold the flexible LED-filament 30 in place and guide the LED-filament along an area and/or length and/or width and/or depth of the elongated optical element 20. Therefore, by the inventive optical element 20, the LED-filament 30 is in direct mechanical and optical contact with the optical element 20. Thus, the need for additional fastening means for securing the LED-filament 30 on the optical structure 10 is eliminated. This significantly reduces further fabrication complexities and material consumption for arranging the LED-filament inside the lighting device such as the light bulb 61. This in turn reduces overall cost per unit of products and supports a more environmentally sustainable production.

The openings 40, 41 may have different geometries or shapes such as circular, semi-circular, hexagonal, rectangular, etc. and provide a boundary enclosing—fully in the case of through holes 40, and partly in the case of recesses 41—a portion 42 of the LED-filament 30 extending through the opening(s) 40, 41. The opening(s) 40, 41 may have a diameter referred to as D1 which may be similar, smaller or larger than the diameter D2 of the portion of the LED-filament 42 extending through the opening(s) 40, 41. Preferably, each opening 40, 41 is substantially filled by the portion 42 of the LED-filament extending through the opening(s) 40, 41, in order to ensure the desired optical interaction.

In case of through holes 41, the diameter D1 is preferably larger than D2, in order to facilitate insertion of the filament through the hole 41. A diameter D1 close to D2 or approximately equal to D2 may be advantageous to fixate the filament in the hole 41. The diameter D1 may even be smaller than D2. Typically, the through-holes 41 may have a diameter D1 such that D1>D2>2D1.

In case of recesses 40, the diameter D1 is typically be approximately the same as the diameter D2. The recess also has a sideways aperture, though which the filament is pushed through into the recess. Preferably, the width of this opening is slightly smaller than the diameter D2, to retain the filament in the recess once put in place. If this width is called W, then typically W<D2<D1.

Figure 2A:
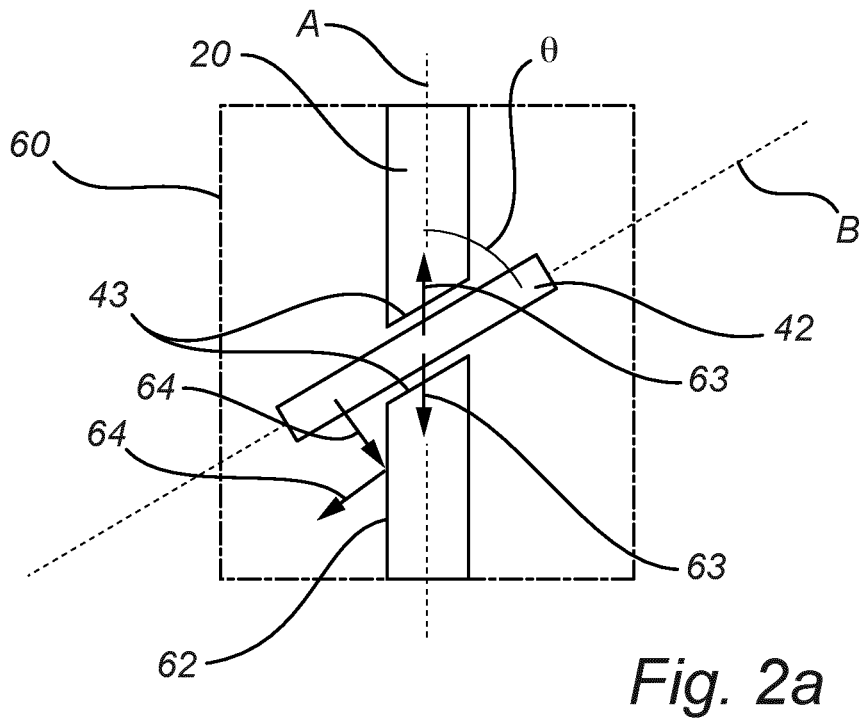
FIG. 2*a* shows a zoomed-in side view of a portion of the optical structure of FIG. 1*a* in accordance with one embodiment of the present invention.
Figure 2B:
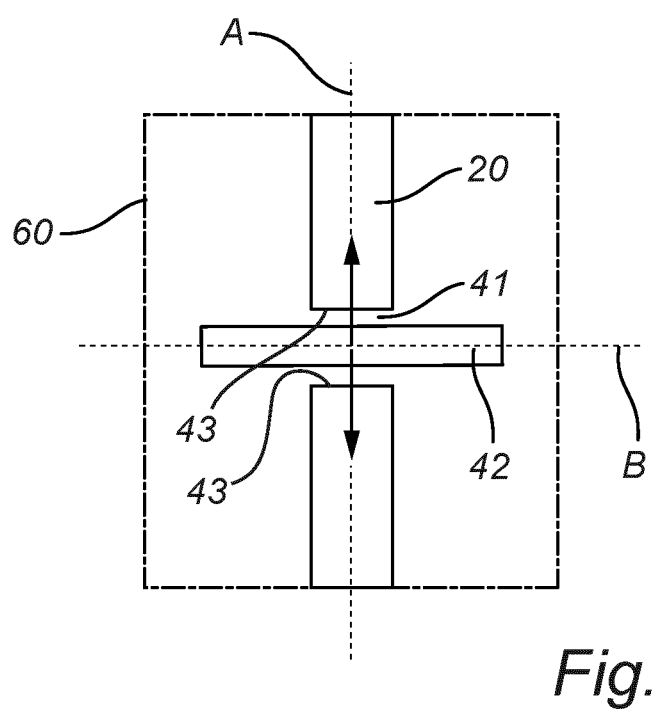
FIG. 2*b* shows a zoomed-in side view of a portion of the optical structure of FIG. 1*a* in accordance with a further embodiment of the present invention.

FIGS. 2a-b show zoomed-in portions of the elongated optical element 20 e.g. a zoomed-in portion 60 of the optical element 20 of FIG. 1a. Portion(s) 42 of the LED-filament 30 extend through respective through holes 41 (similar principles apply also to recesses 40). In FIG. 2a, a tangent 'B' of the portion(s) 42 of the LED-filament 30 at a point of intersection of the portion(s) 42 with a longitudinal axis 'A' of the optical structure 10/elongated optical element 20 forms a first angle 'O' with respect to the longitudinal axis 'A' of the elongated optical element 20. The first angle 'O' may be in a range between 10 degrees to 90 degrees, more preferably between 30 degrees to 90 degrees and most preferably between 80 degrees to 90 degrees. The portion 42 of the LED-filament may also in some embodiments extend through the openings 41 such that several intersection points with the longitudinal axis 'A' may form varying angles with respect to the longitudinal axis 'A' for example at a second angle (not shown) in addition to the first angle 'O'. Here, the elongated optical element 20 is made of a light-guiding material and having surface(s) 62 with light-reflecting properties. Light emitted from the LED-filament 30 i.e. light emitted from the portion 42 arranged in close proximity of the inner walls 43 of the hole 41 is partly coupled into the elongated optical element 20 as shown by arrows 63 and transported inside the light guide 20 by TIR. Light is also partly reflected from the surface(s) 62 of the light guide 20 as shown by arrows 64. This way the decorative lighting effect is further enhanced.

In FIG. 2b, the portion 42 of the LED-filament 30 extends through the opening 41 with its tangent being normal to the longitudinal axis 'A' i.e. 'Θ'=90 degrees.

As illustrated here, only one single LED filament 30 extends through each opening 40, 41. However, the optical structure 10 may preferably comprise at least 10 LED-filaments 30, more preferably at least 15 LED-filaments 30, most preferably at least 20 LED-filaments 30 extending through the opening(s) 40, 41.

The light guide 20 may comprises a plurality of light-extraction features (not shown) to extract or out-couple light from the light guide 20. The light-extraction feature may at least be partly curved light-extraction features expanded/cover over the entire or parts of the light guide 20 and configured to counteract TIR.

A layer of phosphor or light diffusing/scattering material may be covering the surface of LEDs in a flexible matrix such as silicone rubber. The diameter of the LED-filaments is preferably between 1 mm and 3 mm. As illustrated in FIGS. 1a-b the LED-filament may have a helical or meander shape or be oriented and winded in any curving arbitrary path.

Figure 3E:
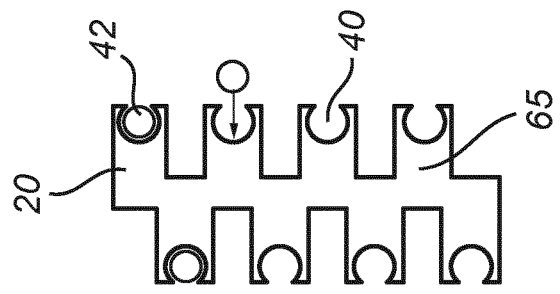
FIGS. 3*a-e* show cross-sectional front views of the optical structure in accordance with some embodiments of the present invention.
Figure 3D:
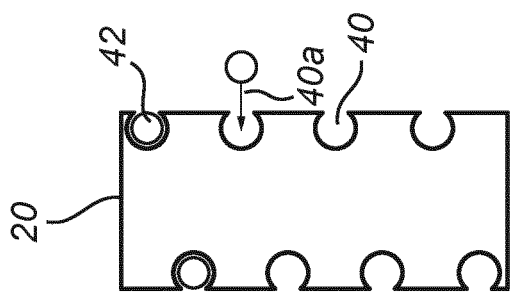
Figure 3C:
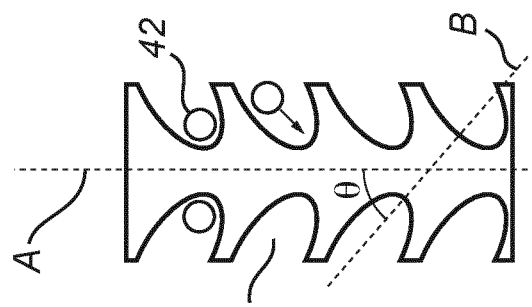
Figure 3B:
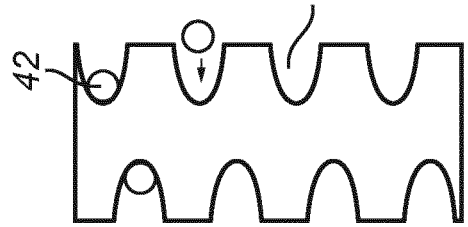
Figure 3A:
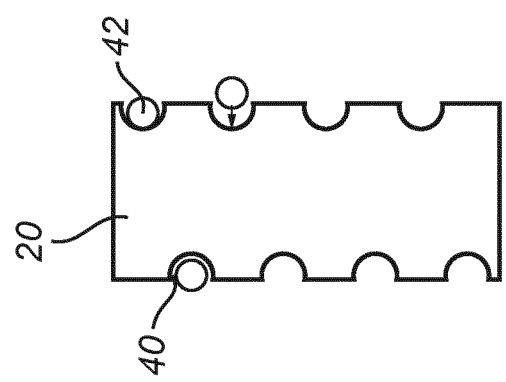

As mentioned above, FIGS. 3a-e show cross-sectional from views of optical structures according to different embodiments of the present invention wherein openings in form of recesses 40 are shaped differently according to the desired application. For instance, in FIG. 3a, the recesses 40 have an approximately semi-circular cross-section and the portions 42 of the LED-filament 30 passing through the recesses 40 have a circular cross-section with similar dimensions i.e. diameter to that of the recesses 40 (D1≈D2). Thus, the portions 42 of the LED-filament 30 could easily be inserted into the respective recesses 40 during manufacturing. In FIG. 3b however, recesses are so shaped e.g. having an approximately half-elliptical cross-section with a tapering wall such that the portions 42 of the LED-filament 30 are caused to be clamped into the recesses 40 such that they are mechanically secured inside the recesses 40. In yet another embodiment shown in FIG. 3c the recesses 40 may be arranged at the first angle 'Θ' with respect to the longitudinal axis 'A' of the elongated optical element 20 thus the portion 42 of the LED-filament 30 could be secured inside the angled recesses 40. FIG. 3d illustrates another embodiment wherein the portions 42 of the LED-filament 30 are secured into the recesses 40 by a snap-action mechanism. In this embodiment the recesses 40 have a smaller opening/entrance portion (part of the wall of the recess removed to allow access to the recess) 40a than the diameter of the LED-filament 30, thus the LED-filament 30 is inserted into the recess 40 by applying a mechanical force in the direction of the depicted arrow. In a different embodiment, the recesses 40 are formed in an elongated optical element 20 having a customized shape for example shaped resembling a flat-plane crankshaft with arms 65 extending at right angles with respect to the longitudinal axis 'A' and recesses 40 devised in each of the extending arms 65.

Figure 4A:
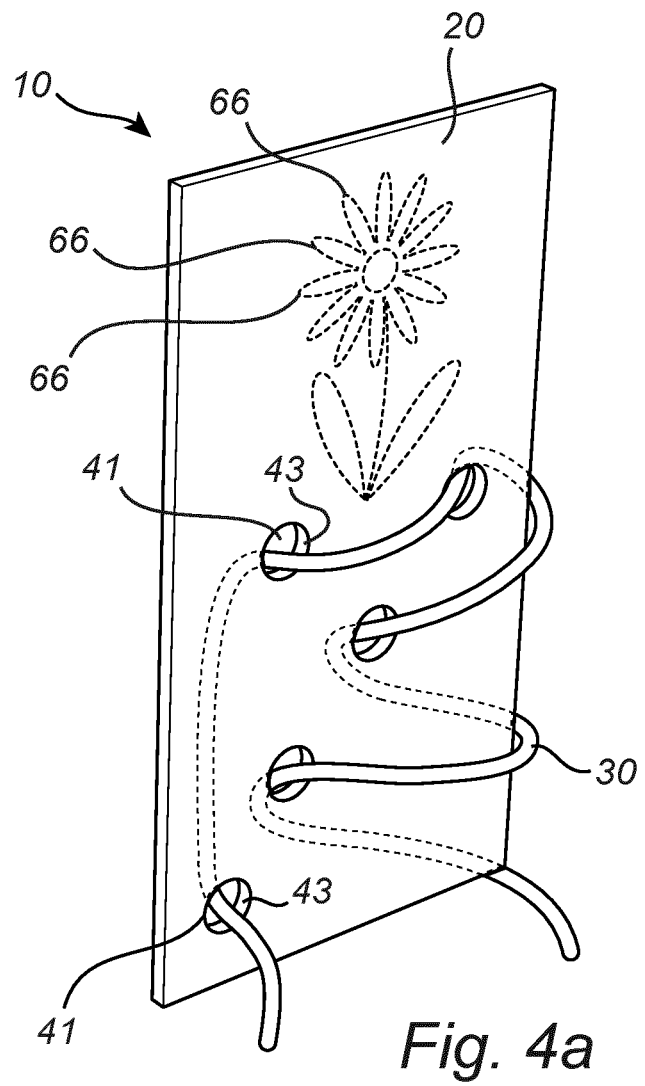
FIG. 4*a* shows a perspective view of an optical structure in accordance with another embodiment of the present invention.
Figure 4B:
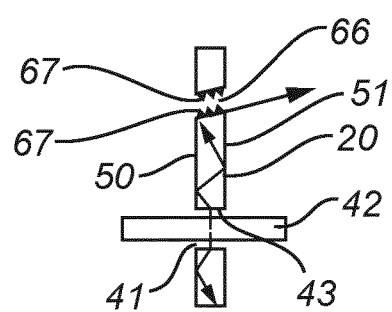
FIG. 4*b* shows a cross-section of a portion of the optical structure in FIG. 4*a*.

With reference primarily to FIGS. 4a and 4b, although the principles are applicable to all embodiments, the openings, through-holes 41 in FIG. 4a, may further comprise at least one surrounding wall 43 serving as a light-incoupling surface such that light emitted from the LED-filaments enters and is coupled into the optical element 20. The arrows show the direction of light being coupled into the elongated optical element 20. Light may also be fully or partly reflected by the in-coupling surface 43 e.g. when the in-coupling surface(s) 43 are made partially or entirely of light-reflecting materials and/or may at least partly be coated with light-reflecting coatings. When the optical element 20 is a light guide, light that enters the light guide 20 at the in-coupling surface(s) 43 during operation may generally be transported over the full area of the light guide 20 by total internal reflection (TIR) e.g. at two opposing surfaces 50 and 51 of the light guide 20. The opposing surfaces 50 and 51 may generally be parallel. Light however, may be transported inside the light guide 20 by TIR at any other surfaces (not shown) of the light guide 20. Light may be reflected at the surfaces of the light guide 20 by TIR at least 3 times, more preferably at least 4 times, most preferably at least 5 times.

The optical element 20 in FIG. 4a further comprises a plurality of light-extraction structures 66 e.g. indentations and/or perforations. These structures 66 may form a decorative pattern (a flower in this example) arranged on any part of the elongated optical element 20 such that in operation, when light emitted from the LED-filament and coupled into the light guide 20 reaches the perforations 66, light will be out-coupled and the pattern can be visibly illuminated. Light reflected by the element 20 or by the reflecting structures 62 may also reach the structures 66. The perforations 66 can be manufactured into a reflective element or a light guide for example by laser patterning. As shown in FIG. 4b, the perforation 66 are here through holes with surfaces 67 which may act like out-coupling/light-extraction features and thus counteract transport of light by total internal reflection inside the elongated optical element 20. This in turn results in illumination and illustration of the decorative pattern.

Figure 5A:
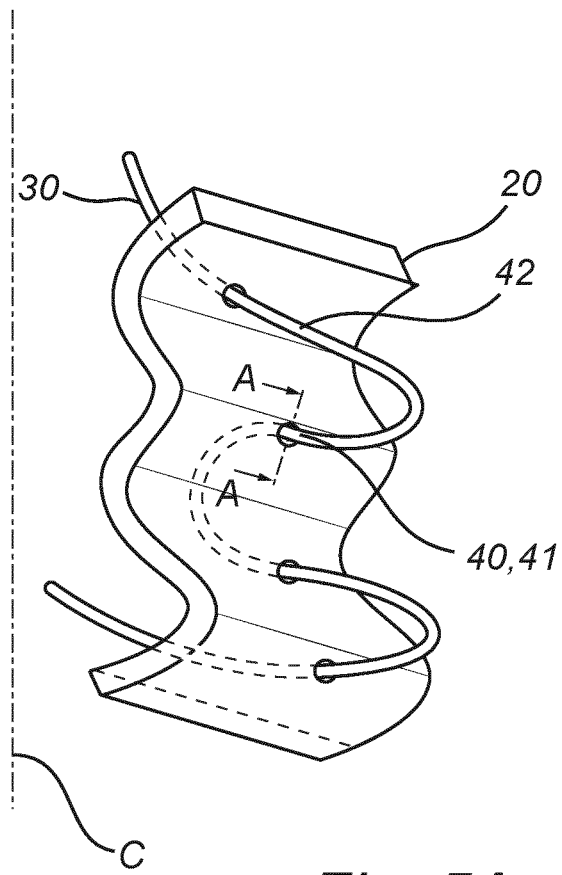
FIG. 5*a* shows a perspective view of an optical structure in accordance with another embodiment of the present invention.
Figure 5B:
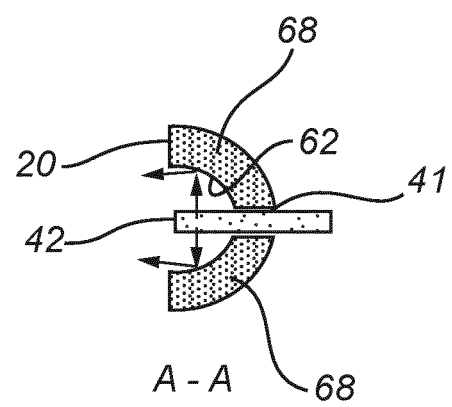
FIG. 5*b* shows a cross-section of a portion of the optical structure in FIG. 5*a*.

In a different embodiment illustrated in FIG. 5, the elongated optical element 20 may comprise curved features 68 preferably in the vicinity of the openings 40, 41. In this embodiment the curved and/or bent features 68 are bent out of the reference plane 'C' of the flat surface of the optical element 20 and are preferably made of light-reflecting material. The curved features 68 preferably have a radius of curvature corresponding to a segment of a circle with a radius in the range between 5 mm and 50 mm. The reflector features 68 reflect light emitted from the portion 42 of the LED-filament 30 in certain directions e.g. in lateral direction (as shown by the arrows in this example) and/or upwards direction and/or downwards direction of the optical structure. This way certain parts of the light bulb of FIG. 1a such as top of the light bulb and/or lateral sides of the light bulb is provided with an enhanced decorative lighting effects.

Figure 6A:
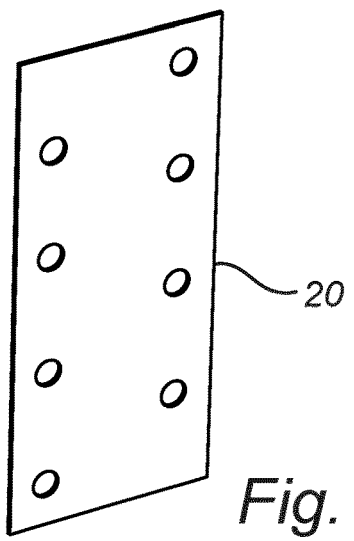
FIGS. 6*a-e* show various geometrical shapes of an optical element in accordance with some embodiments of the present invention.
Figure 6B:
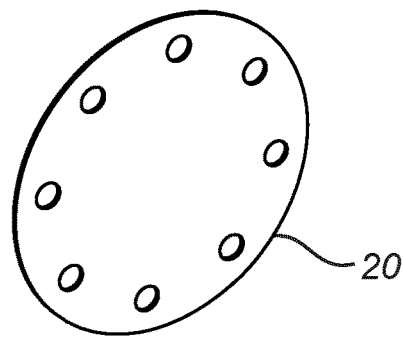
Figure 6C:
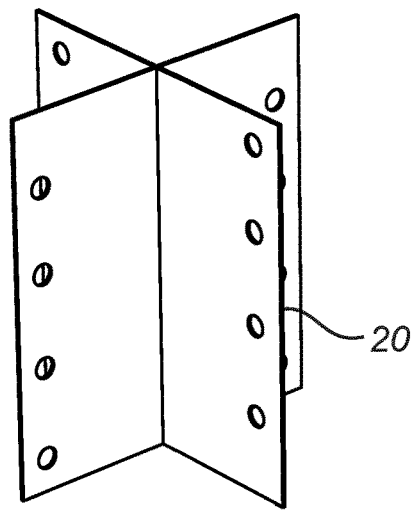
Figure 6D:
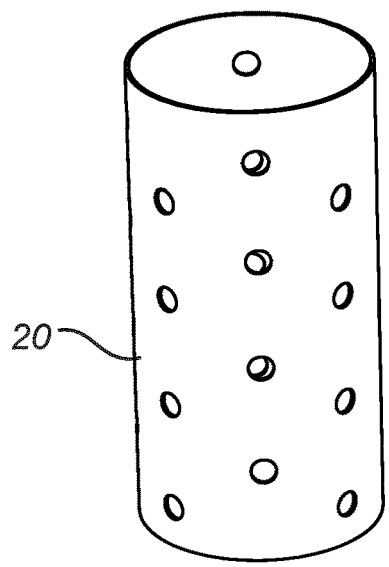
Figure 6E:
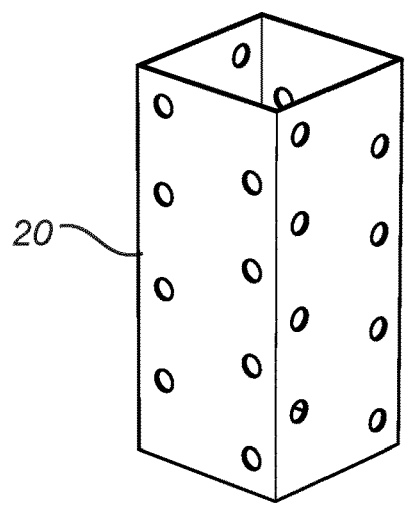

FIGS. 6a-e shows various shapes of the optical element. The optical element may be an elongated flat plate (FIG. 6a) such as a sheet of polymer, it may also be formed as a disc (FIG. 6b), or a plurality of intersecting sheets (FIG. 6c), a hollow cylinder (FIG. 6d) or a hollow rectangular cuboid/bar (FIG. 6e). It is however obvious to the skilled person to adapt other shapes and/or geometries as needed to achieve desired lighting profiles without departing from the scope of the appended claims.

The person skilled in the art realizes that the present invention by no means is limited to the preferred embodiments described above. On the contrary, many modifications and variations are possible within the scope of the appended claims. For instances, the light bulb may comprises more than one optical structure according to the invention. Alternatively or additionally, each optical structure may comprises more than one optical element. The optical element may also comprise a plurality of flexible LED-filaments. Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. An optical structure for producing a decorative lighting effect in a lighting device, said optical structure comprising:
   an optical element formed in one piece and comprising at least two openings;
   an LED-filament comprising a substrate and a plurality of light sources arranged on said substrate, said substrate being at least partly made of a flexible material;
   said LED filament comprises two or more portions;
   wherein each of said openings is adapted to receive said LED-filament such that a portion of said LED-filament respectively extends through and is at least partly enclosed by a surrounding wall of said at least one opening such that said LED-filament is guided by and held in place by means of said at least one opening of the optical element and wherein light emitted from said LED-filament interacts with said optical element, and
   wherein the two or more portions are arranged to respectively extends through respective two or more openings of said optical element.

2. The optical structure according to claim 1, wherein said optical element is made of a light-guiding material.

3. The optical structure according to claim 1, wherein the surrounding wall of said at least one opening forms a light in-coupling surface for light emitted from the LED-filament to enter said optical element such that light is at least partly coupled into said optical element via said light in-coupling surface.

4. The optical structure according to claim 3, wherein said optical element further comprises a plurality of light-extraction features.

5. The optical structure according to claim 1, wherein said optical element is made of a light-reflecting material.

6. The optical structure according to claim 1, wherein said at least one opening includes at least one recess arranged at a periphery of said optical element.

7. The optical structure according to claim 1, wherein said at least one opening includes at least one through-hole in said optical element.

8. The optical structure according to claim 2, wherein said optical element further comprises a light-reflecting surface adapted to at least partly reflect light emitted from said LED-filament and/or light extracted from said optical element.

9. The optical structure according to claim 1, wherein said optical element is made of said light-guiding and/or light-reflecting material having a geometrical shape of any of a disc, a hollow cylinder, and a hollow rectangular bar.

10. The optical structure according to claim 1, wherein said portion of said LED-filament is arranged at a first angle with respect to a longitudinal axis of said optical structure, and wherein said first angle is in a range between 10 degrees to 90 degrees, more preferably between 30 degrees to 90 degrees and most preferably between 80 degrees to 90 degrees.

11. The optical structure according to claim 1, wherein said optical element further comprises a plurality of perforations, said plurality of perforations forming a decorative pattern, such that said pattern is illustrated when said plurality of perforations are illuminated by light emitted from said LED-filament.

12. The optical structure according to claim 1, wherein said optical element further comprises a plurality of at least partly curved light-reflecting features bent out of a reference plane of the optical element and arranged adjacent to said at least one opening.

13. A lighting device comprising:
   at least one optical structure according to claim 1; wherein in operation said lighting device is configured to provide a decorative lighting effect.

14. Method of manufacturing an optical structure according to claim 1, wherein the optical element of the optical structure is made by one of: extrusion, injection molding, embossing and laser cutting.

* * * * *